United States Patent
Cheng

(10) Patent No.: US 8,774,095 B2
(45) Date of Patent: Jul. 8, 2014

(54) WIRELESS ACCESS POINT DEVICE AND COMMUNICATION COLLISION AVOIDING METHOD

(75) Inventor: Chi-Wen Cheng, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 236 days.

(21) Appl. No.: 13/280,362

(22) Filed: Oct. 25, 2011

(65) Prior Publication Data

US 2013/0100881 A1  Apr. 25, 2013

(51) Int. Cl.
*H04L 12/28* (2006.01)
*H04J 3/00* (2006.01)
*H04W 4/00* (2009.01)

(52) U.S. Cl.
USPC ............ 370/328; 370/336; 370/338; 370/431

(58) Field of Classification Search
USPC ................ 370/328–338, 348–352, 445–454; 455/436–444; 709/224–229
See application file for complete search history.

(56) References Cited

U.S. PATENT DOCUMENTS

| | | | |
|---|---|---|---|
| 7,054,329 B2 * | 5/2006 | Cervello et al. ............... | 370/447 |
| 7,486,650 B2 * | 2/2009 | Trainin ........................ | 370/338 |
| 7,489,650 B2 * | 2/2009 | Ginzburg et al. ............. | 370/314 |
| 7,623,481 B2 * | 11/2009 | Chen ............................ | 370/322 |
| 7,782,822 B2 * | 8/2010 | Xhafa et al. .................. | 370/336 |
| 7,826,473 B2 * | 11/2010 | Kwon et al. ................... | 370/445 |
| 7,916,703 B2 * | 3/2011 | Yang et al. .................... | 370/338 |
| 7,924,864 B2 * | 4/2011 | Le et al. ........................ | 370/431 |
| 8,451,771 B2 * | 5/2013 | Hedayat et al. ............... | 370/322 |
| 8,483,128 B2 * | 7/2013 | Lin et al. ....................... | 370/328 |
| 2005/0099978 A1 * | 5/2005 | Chandra et al. ............... | 370/338 |
| 2007/0153755 A1 | 7/2007 | Yang et al. | |
| 2009/0135726 A1 | 5/2009 | Balan et al. | |
| 2010/0002677 A1 | 1/2010 | Lin et al. | |
| 2011/0149918 A1 * | 6/2011 | Gong et al. ................... | 370/336 |

\* cited by examiner

*Primary Examiner* — Man Phan

(74) *Attorney, Agent, or Firm* — Novak Druce Connolly Bove + Quigg LLP

(57) ABSTRACT

A wireless access point device receives a packet including a first source port number from a source wireless terminal device, determines if the packet is a control packet according to the first source port number, and obtains a time interval and a second source port number from the control packet and to receive a new packet. The wireless access point device further determines if the new packet is the data packet according to whether the first source port number of the new packet is the same as the second source port number, starts a timer to time for the time interval once the new packet is the data packet, and transmits a Clear-to-Sent packet to other wireless terminal devices once the timer times out.

12 Claims, 5 Drawing Sheets

WIRELESS ACCESS POINT DEVICE AND COMMUNICATION COLLISION AVOIDING METHOD

BACKGROUND

1. Technical Field

Embodiments of the present disclosure relate to wireless access point devices, and more particularly to a communication collision avoiding method of a wireless access point device.

2. Description of Related Art

A wireless access point device is widely used to establish communication for multiple wireless terminal devices. FIG. 5 shows communication between the multiple wireless terminal devices according to current technology. For example, when a wireless access point device is going to establish communication for a first wireless terminal device and a second wireless terminal device in FIG. 5, the first wireless terminal device transmits a control packet to the wireless access point device to establish communication with the second wireless terminal device. The control packet loads a parameter called port time, and after the communication is established by the wireless access point device, the first wireless terminal device transmits data packets to the second wireless terminal device at intervals of the port time.

For example, if the port time is 20 millisecond (ms), the wireless access point device receives the data packets every 20 ms from the first wireless terminal device. In detail, when the wireless access point device receives a first data packet at the 10th ms, then the wireless access point device will receive a second, third, fourth, . . . data packets at the 30th ms, 50th ms, 70th ms, . . . from the first wireless terminal device. However, because the wireless access point device serves many other wireless terminal devices, and not only the first wireless terminal device, the wireless access point device may receive more than one kind of data packets from other wireless terminal devices at a same time point, such as the 30th ms, which leads to collision in the wireless access point device.

The collision directly leads to packet lost in the wireless access point device and then decreases quality of service of wireless communication between the wireless terminal devices. Therefore, a heretofore unaddressed need exists in wireless access point devices to overcome the aforementioned deficiencies and inadequacies.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
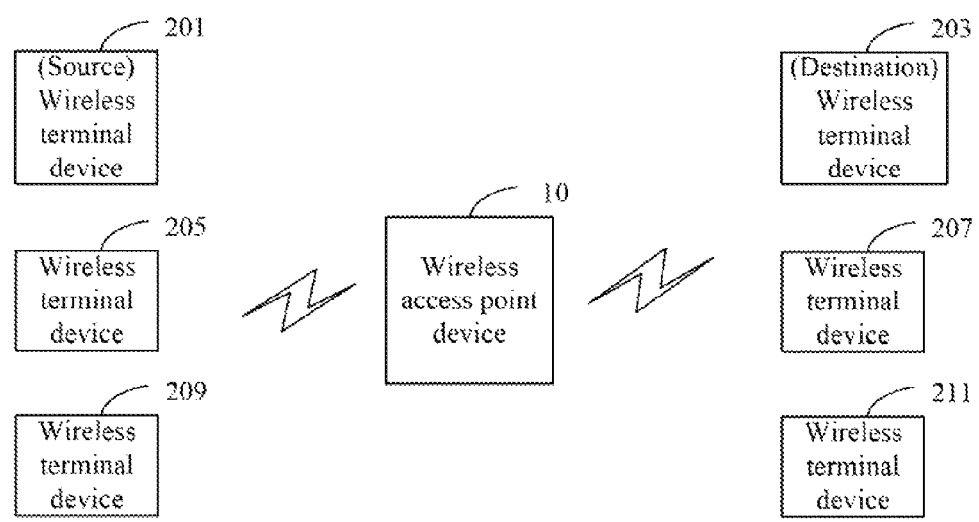
FIG. 1 is a schematic diagram of environment of a wireless access point device of one embodiment of the present disclosure.

FIG. 1 is a schematic diagram of application environment of a wireless access point device 10 of one embodiment of the present disclosure. In one embodiment, wireless terminal devices 201, 203, 205, 207, 209, and 211 establish wireless communication with each other via the wireless access point device 10. For example, the wireless access point device 10 can establish wireless communication for the wireless terminal device 201 and the wireless terminal device 203.

Figure 2:
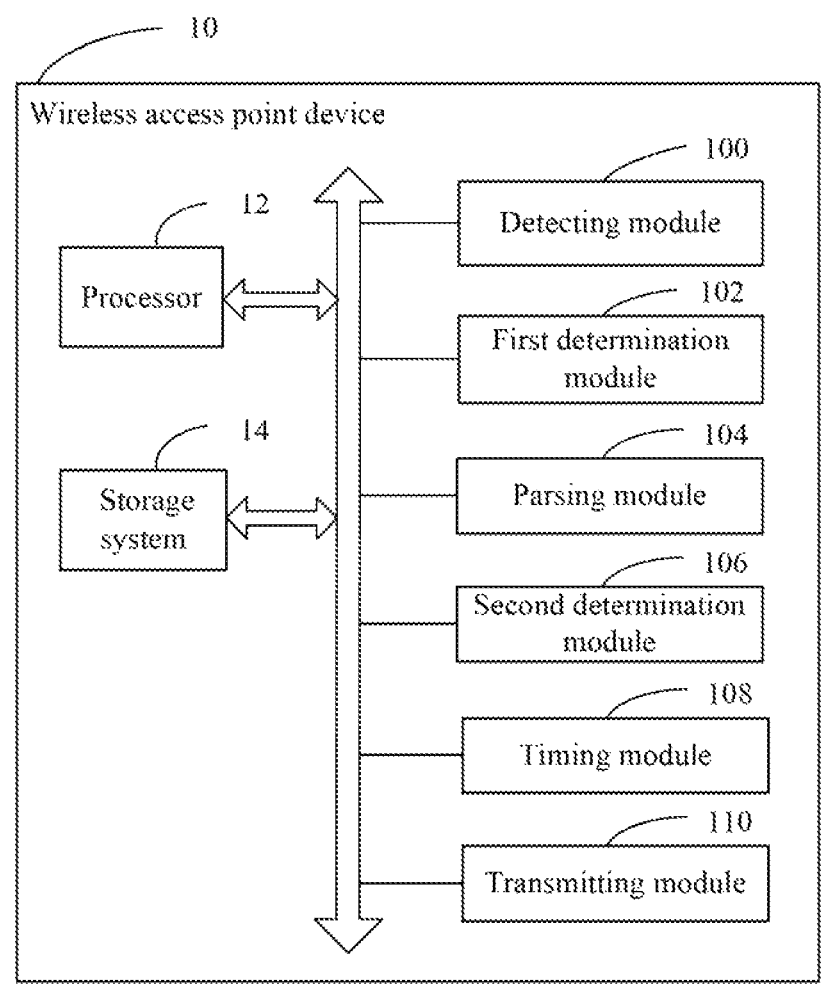
FIG. 2 is a schematic diagram of functional modules of the wireless access point device of FIG. 1.

FIG. 2 is a schematic diagram of functional modules of the wireless access point device 10 of one embodiment of the present disclosure. In one embodiment, the wireless access point device 10 includes a processor 12, a storage system 14, a detecting module 100, a first determination module 102, a parsing module 104, a second determination module 106, a timing module 108, and a transmitting module 110.

The above modules 100-110 may comprise one or more software programs in the form of computerized codes that are stored in the storage system 14. The computerized codes include instructions that are executed by the processor 12 to provide functions for those modules 100-110. In one embodiment, the storage system 14 includes a synchronous dynamic random access memory (SDRAM), a hard disk, and other kinds of hardware in which data can be stored.

In one embodiment, if one of the wireless terminal devices requires establishing communication with another wireless terminal device, then the one wireless terminal device is called a source wireless terminal device, and the another wireless terminal device is called a destination wireless terminal device. Hereinafter taking the wireless terminal device 201 establishing communication with the wireless terminal device 203 for example, then the source wireless terminal device is the wireless terminal device 201, and the destination wireless terminal device is the wireless terminal device 203.

In one embodiment, the detecting module 100 receives packets each including a source port number from the source wireless terminal device 201. In one embodiment, the source port number indicates a port number of a device which transmits the packets to the detecting module 100, here namely the source wireless terminal device 201.

In one embodiment, if the source wireless terminal device 201 wants to communicate with the destination wireless terminal device 203, the source wireless terminal device 201 transmits a control packet to the wireless access point device 10 to establish communication with the destination wireless terminal device 203. Under permission of the wireless access point device 10, the source wireless terminal device 201 can communicate with the destination wireless terminal device 203, namely transmitting data packets to the destination wireless terminal device 203.

The control packet comprises a time interval and a source port number used for transmitting data packets when the communication connection is established. For example, when the time interval is 20 millisecond (ms) and the source port number to transmit the data packets is 60, that means, the source wireless terminal device 201 transmits the data packets at intervals of 20 ms and the source port number of transmitting the data packets is 60.

The first determination module 102 determines if the packet is a control packet for establishing communication connection with the destination wireless terminal device 203 according to the source port number of the packet. In one embodiment, the first determination module 102 determines if the source port number of the packet is equal to a preset port number to determine if the packet is a control packet.

In one embodiment, the preset port number is preset according to communication protocol employed by the source wireless terminal device 201 and the destination wireless terminal device 203. For example, if the communication protocol employed by the source wireless terminal device 201 and the destination wireless terminal device 203 is HyperText Transfer Protocol (HTTP), then the preset port number is preset as 80. If the communication protocol employed by the source wireless terminal device 201 and the destination wireless terminal device 203 is Media Gateway Control Protocol (MGCP), then the preset port number is preset as 2427. If the communication protocol employed by the source wireless terminal device 201 and the destination wireless terminal device 203 is Session Initiation Protocol (SIP), then the preset port number is preset as 5060.

In one embodiment, the first determination module 102 determines the packet is the control packet when the source port number of the packet is equal to a preset port number. The first determination module 102 determines the packet is not the control packet when the source port number of the packet is not equal to the preset port number. For example, if the communication protocol employed by the source wireless terminal device 201 and the destination wireless terminal device 203 is HTTP, then the first determination module 102 determines the packet is the control packet when the source port number of the packet is 80, and the first determination module 102 determines the packet is not the control packet when the source port number of the packet is not 80.

The detecting module 100 continuously receives more packets from the source wireless terminal device 201 until the control packet is received if the first determination module 102 determines the packet is not the control packet.

The parsing module 104 parses the packet to obtain the time interval and the source port number of transmitting the data packets if the packet is determined is the control packet and to receive a new packet from the source wireless terminal device 201.

The second determination module 106 determines if the new packet is the data packet according to whether the source port number of the new packet is same to the source port number of transmitting the data packets. The second determination module 106 determines the new packet is the data packet if the source port number of the new packet is equal to the source port number of transmitting the data packets obtained by the parsing module. The second determination module 106 determines the new packet is not the data packet if the source port number of the new packet is not equal to the second source port number of transmitting the data packets obtained by the parsing module.

For example, if the source port number of transmitting the data packets obtained by the parsing module is sixty, then the first second determination module 106 determines the packet is the data packet when the source port number of the new packet is sixty, and the second determination module 106 determines the new packet is not the data packet when the source port number of the new packet is not sixty.

In one embodiment, the detecting module 100 continuously receives more new packets from the source wireless terminal device 201 if the second determination module 106 determines the new packet is not the data packet.

The timing module 108 starts a timer once the new packet is determined is the data packet by the second determination module 106. In one embodiment, the timer is preset to time for the time interval obtained by the parsing module 104, such as 20 ms.

The transmitting module 110 transmits a Clear-to-Sent packet to the other wireless terminal devices, namely the wireless terminal devices 205, 207, 209, and 211, to notice the other wireless terminal devices to stop transmitting packets to the wireless access point device 10 when the timer times out. Then, the other wireless terminal devices will stop transmitting packets to the wireless access point device 10, which avoids collision on the wireless access point device 10.

In one embodiment, the transmitting module 110 further determines if the source wireless terminal device 201 is disconnected from the destination wireless terminal device 203 once the timer times out, and restarts the timer to time if the communication connection between the source wireless terminal device 201 and the destination wireless terminal device 203 is still kept.

Figure 3:
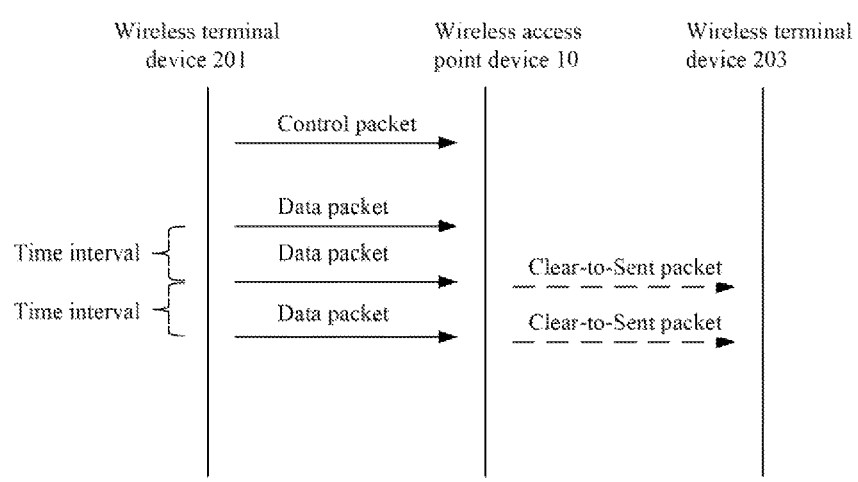
FIG. 3 is a schematic diagram of communication between multiple wireless terminal devices of one embodiment of the present disclosure.

FIG. 3 is a schematic diagram of communication between multiple wireless terminal devices of one embodiment of the present disclosure. As shown in FIG. 3, taking the wireless access point device 10 establishes communication for the wireless terminal device 201 and the wireless terminal device 203 for example, if the wireless terminal device 201 wants to communicate with the wireless terminal device 203, then the wireless terminal device 201 transmits the control packet to the wireless access point device 10 to require establishing communication with the wireless terminal device 203. After permission of the wireless access point device 10, the wireless terminal device 201 starts to transmit the data packets to the wireless terminal device 203 at interval of a fixed time period via the wireless access point device 10.

In one embodiment, when the wireless access point device 10 receives the data packet from the wireless terminal device 201 at a first time, then the timing module 108 starts the timer to time. The timer is preset to time for the time period transmitting the data packets of the wireless terminal device 201, such as 20 ms. When the timer times out, the transmitting module 110 of the wireless access point device 10 transmits the Clear-to-Sent packets to the wireless terminal devices 203, 205, 207, 209, and 211 (only 203 is shown in FIG. 3 for simplicity) to notice the wireless terminal devices 203, 205, 207, 209, and 211 to stop transmitting packets to the wireless access point device 10, which avoids collision on the wireless access point device 10.

For example, if the time interval of transmitting the data packets of the wireless terminal device 201 is 20 ms, and if the wireless access point device 10 receives first data packet from the wireless terminal device 201 at the 30th ms, then the wireless access point device 10 receives second, third, fourth, . . . data packets from the wireless terminal device 201 at the 50th ms, the 70th ms, the 90th ms, . . . . The timing module 108 presets the timer to time at intervals of 20 ms and starts the time to time at the 30th ms. When the timer times out at the 50th ms, the 70th ms, the 90th ms, . . . , the transmitting module 110 of the wireless access point device 10 transmits the Clear-to-Sent packets to the wireless terminal devices 203, 205, 207, 209, and 211 (only 203 is shown in FIG. 3 for simplicity) to notice the wireless terminal devices 203, 205, 207, 209, and 211 to stop transmitting packets to the wireless access point device 10.

Then, the wireless terminal devices 203, 205, 207, 209, and 211 will stop transmitting packets to the wireless access point device 10 at the 50th ms, the 70th ms, the 90th ms, . . . , which avoids collision happened at the 50th ms, the 70th ms, the 90th ms, . . . . To avoid collision on the wireless access point device 10 can decrease packet lost on the wireless access point device 10 and improve quality of the wireless communication service provided by the wireless access point device 10.

Figure 4:
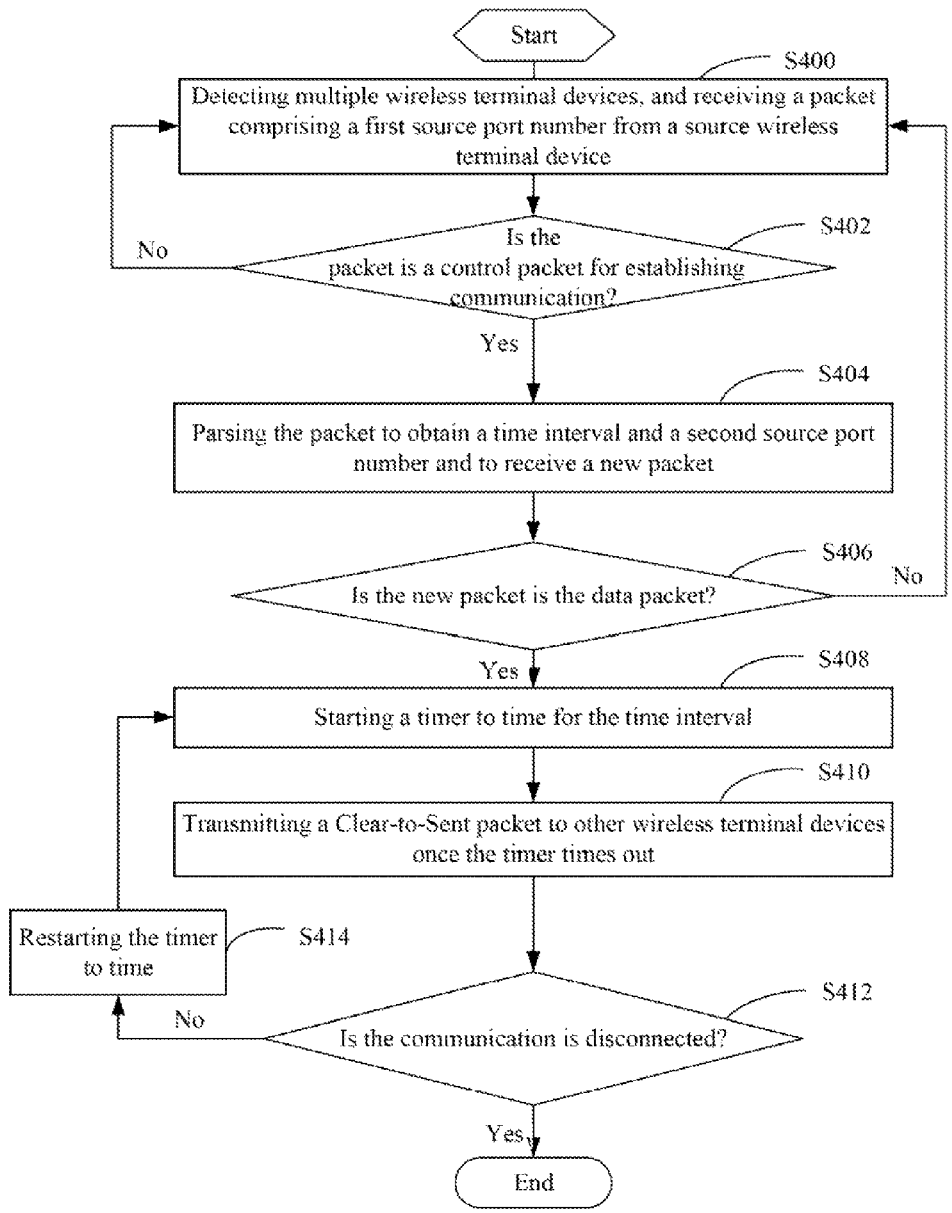
FIG. 4 is a schematic flowchart of a collision avoiding method of one embodiment of the present disclosure.
Figure 5:
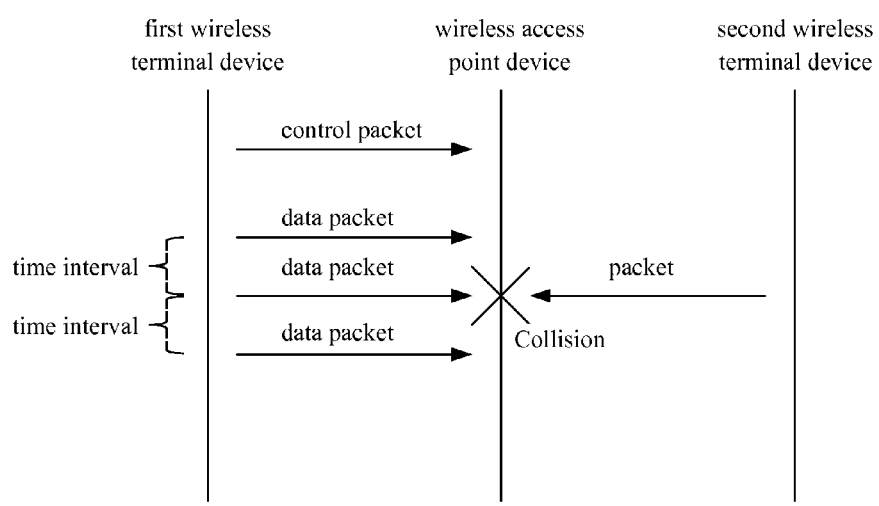
FIG. 5 is a schematic diagram of communication between multiple wireless terminal devices according to current technology.

FIG. 4 is a flowchart of one embodiment of a collision avoiding method of one embodiment of the present disclosure. The flowchart is executed by the modules of the wireless access point device 10 of FIG. 2. Depending on the embodiment, additional blocks may be added, others deleted, and the ordering of blocks may be changed while remaining well within the scope of the disclosure.

In block S400, the detecting module 100 detects the wireless terminal devices 201, 203, 205, 207, 209, and 211 to detect a source wireless terminal device (hereinafter taking the wireless terminal device 201 as the source wireless terminal device for example). After detecting the source wireless terminal device 201, the detecting module 100 receives packets each including a source port number from the source wireless terminal device 201.

In block S402, the first determination module 102 determines if the packet is a control packet for establishing communication according to the source port number of the packet. In one embodiment, the first determination module 102 determines the packet is the control packet when the source port number of the packet is equal to a preset port number. The first determination module 102 determines the packet is not the control packet when the source port number of the packet is not equal to the preset port number.

If the first determination module 102 determines the packet is not the control packet, then in step S400, the detecting module 100 continuously receives more packets from the source wireless terminal device 201 until the control packet is received.

If the first determination module 102 determines the packet is the control packet, then in step S404, the parsing module 104 parses the packet to obtain the time interval and the source port number of transmitting the data packets and to receive a new packet from the source wireless terminal device 201.

In step S406, the second determination module 106 determines if the new packet is the data packet according to whether the source port number of the new packet is same to the source port number of transmitting the data packets. In one embodiment, the second determination module 106 determines the new packet is the data packet if the source port number of the new packet is equal to the source port number of transmitting the data packets obtained by the parsing module. The second determination module 106 determines the new packet is not the data packet if the source port number of the new packet is not equal to the source port number of transmitting the data packets obtained by the parsing module.

If the second determination module 106 determines the new packet is not the data packet, then in step S400, the detecting module 100 continuously receives more new packets from the source wireless terminal device 201 until the data packet is received.

If the second determination module 106 determines the new packet is the data packet, then in step S408, the timing module 108 starts a timer. In one embodiment, the timer is preset to time for the time interval obtained by the parsing module 104, such as 20 ms.

When the timer times out, in step S410, the transmitting module 110 transmits a Clear-to-Sent packet to the other wireless terminal devices, namely the wireless terminal devices 205, 207, 209, and 211, to notice the other wireless terminal devices to stop transmitting packets to the wireless access point device 10. Then, the other wireless terminal devices will stop transmitting packets to the wireless access point device 10, which avoids collision on the wireless access point device 10.

In step S412, the transmitting module 110 further determines if the source wireless terminal device 201 is disconnected from the destination wireless terminal device 203 once the timer times out. If the communication connection between the source wireless terminal device 201 and the destination wireless terminal device 203 is still kept, then in step S414, the transmitting module 110 restarts the timer to time.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A wireless access point device, providing communication services for a plurality of wireless terminal devices comprising at least one source wireless terminal device and at least one destination wireless terminal device, the wireless access point device comprising:

a processor; and a storage system storing one or more software programs in the form of computerized codes operable to be executed by the processor to perform a method, the method comprising:

receiving a packet comprising a first source port number from the at least one source wireless terminal device;

determining if the packet is a control packet for establishing communication connection with the at least one destination wireless terminal device according to the first source port number, wherein the control packet comprises a time interval and a second source port number used for transmitting data packets when the communication connection is established;

parsing the packet to obtain the time interval and the second source port number if the packet is the control packet and to receive a new packet from the at least one source wireless terminal device;

determining if the new packet is the data packet according to whether a source port number of the new packet is same to the second source port number;

starting a timer once the new packet is the data packet, wherein the timer is preset to time for the time interval; and transmitting a Clear-to-Sent packet to other wireless terminal devices other than the source and destination wireless terminal devices to notice the other wireless terminal devices to stop transmitting packets to the wireless access point device when the timer times out.

2. The wireless access point device as claimed in claim 1, wherein the packet is the control packet when the first source port number of the packet is equal to a preset port number, wherein the preset port number is preset according to communication protocol employed by the source wireless terminal device and the destination wireless terminal device.

3. The wireless access point device as claimed in claim 2, wherein the method further comprising: continuously receiving more packets if the first determination module determines the packet is not the control packet.

4. The wireless access point device as claimed in claim 1, wherein the new packet is the data packet if the source port number of the new packet is equal to the second source port number.

5. The wireless access point device as claimed in claim 4, wherein the method further comprising: continuously receiving more new packets if the new packet is not the data packet.

6. The wireless access point device as claimed in claim 1, wherein the method further comprising: determining if the source wireless terminal device is disconnected from the destination wireless terminal device once the timer times out, and restarting the timer to time if the communication connection between the source wireless terminal device and the destination wireless terminal device is still kept.

7. A communication collision avoiding method of a wireless access point device, the wireless access point device providing communication services for a plurality of wireless terminal devices comprising at least one source wireless terminal device and at least one destination wireless terminal device, the method comprising:
   receiving a packet comprising a first source port number from the at least one source wireless terminal device;
   determining if the packet is a control packet for establishing communication connection with the at least one destination wireless terminal device according to the first source port number, wherein the control packet comprises a time interval and a second source port number used for transmitting data packets when the communication connection is established;
   parsing the packet to obtain the time interval and the second source port number if the packet is the control packet and to receive a new packet from the at least one source wireless terminal device;
   determining if the new packet is the data packet according to whether a source port number of the new packet is same to the second source port number;
   starting a timer once the new packet is the data packet, wherein the timer is preset to time for the time interval; and
   transmitting a Clear-to-Sent packet to other wireless terminal devices other than the source and destination wireless terminal devices to notice the other wireless terminal devices to stop transmitting packets to the wireless access point device when the timer times out.

8. The communication collision avoiding method as claimed in claim 7, wherein the packet is the control packet when the first source port number of the packet is equal to a preset port number, wherein the preset port number is preset according to communication protocol. employed by the source wireless terminal device and the destination wireless terminal device.

9. The communication collision avoiding method as claimed in claim 8, further comprising: continuously receiving more packets if the packet is not the control packet.

10. The communication collision avoiding method as claimed in claim 7, wherein the new packet is the data packet if the source port number of the new packet is equal to the second source port number.

11. The communication collision avoiding method as claimed in claim 10, further comprising: continuously receives more new packets if the new packet is not the data packet.

12. The communication collision avoiding method as claimed in claim 7, further comprising:
   determining if the source wireless terminal device is disconnected from the destination wireless terminal device once the timer times out; and
   restarting the timer to time if the communication connection between the source wireless terminal device and the destination wireless terminal device is still kept.

\* \* \* \* \*